Dec. 7, 1926.
S. COHEN
1,609,931
ELECTRICAL CONDENSER
Filed Oct. 30, 1923
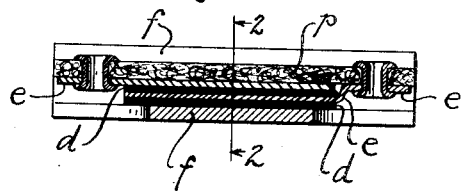
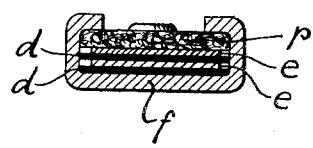
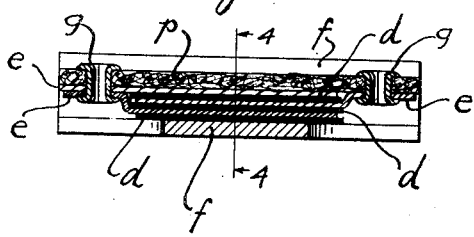
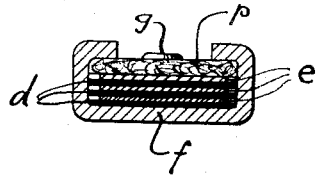
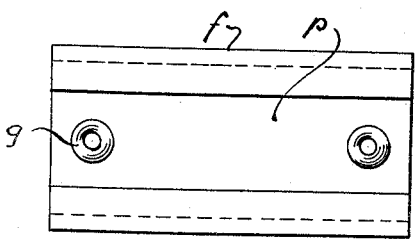
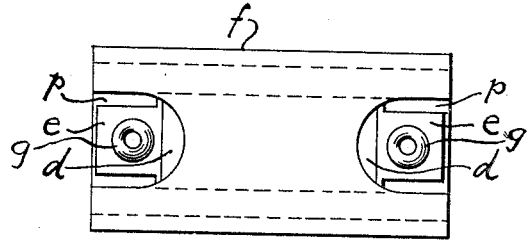
Samuel Cohen INVENTOR,
BY James F. Watson ATTORNEY.

Patented Dec. 7, 1926.

1,609,931

UNITED STATES PATENT OFFICE.

SAMUEL COHEN, OF NEW YORK, N. Y.

ELECTRICAL CONDENSER.

Application filed October 30, 1923. Serial No. 671,655.

My invention relates to improvements in electrical condensers of the solid dielectric type and the objects of my improvements are to produce an electrical condenser of constant capacity independent of the conditions under which the condenser is subjected; also to produce a condenser having a relatively low dielectric hysteresis loss and in which the plate contact resistance is reduced to the minimum; and also to produce an electrical condenser in which eddy or circulating currents are eliminated or reduced to the minimum.

I obtain a condenser having a relatively low hysteresis dielectric loss by using mica of the better grade as a solid dielectric and I reduce the loss between the condenser plate and the dielectric by spraying, under pressure, the dielectric material with a conducting metal, preferably an oxide of silver (or of gold or platinum), and then I subject the sprayed dielectric material to a temperature which will weld or fuse the metallic metal particles to the dielectric material, care being taken that the entire surface of the dielectric material is metal coated.

Referring to the figures of the drawing, Fig. 1 is a front sectional view and Fig. 2 is a side sectional view of an electrical condenser having an even number of alternately connected electrodes or connecting plates, $e, e$. The coated dielectric material is indicated by the letter $d$, the insulating material between the dielectric and the clamping frame is indicated by the letter $p$, and the clamping or binding frame by the letter $f$. In this construction where the number of alternately connected electrodes or plates are two, or any even number, with the binding frame, $f$, rigidly connected or integral with the insulating material, $p$, the difference in polarity between the top and bottom portions of the metal structure, $f$, will cause eddy or circulating currents and result in considerable losses.

Fig. 3 is a front sectional view, and Fig. 4 is a side sectional view of an electrical condenser which has an odd number of electrodes or plates. The general construction is the same as shown in Figs. 1 and 2, $e$ representing the electrodes or plates, $d$ the dielectric material, $p$ the insulating material between the frame and the dielectric, and $f$ the binding or clamping frame. The electrodes or plates are alternately connected by the connecting wire or eyelet, $g$. In this construction the dielectric sheets, $d$, will ordinarily be even in number. The capacity of the condenser may be of any desired value by the adjustment of the size and design of the plate electrodes and of the dielectric material, and by increasing the number of electrodes and the dielectric sheets. The electrodes or plates should be alternately connected as shown in Fig. 3.

In my method of construction, the polarity of the bottom and top plates or electrodes are the same and hence no circulating currents are caused to flow in the binding or clamping plate as found to exist in the construction shown in Fig. 1, where an even number of electrodes are used.

After the heat treatment, the dielectric material with its coating of silver (gold, or platinum) may be placed in an electrolytic copper bath and there receive a coating of copper which provides a double assurance of a lower plate resistance. To reduce further the plate contact resistance, I use a plate of substantially equivalent area to that of the coated portion of the dielectric and place this plate in direct contact with the deposited metal (silver, copper, gold or platinum) surface. This plate is also used for making electrical connections, externally to the condenser, with the circuit in which the condenser is used.

The entire condenser unit is firmly pressed and clamped together in the manner shown in Figs. 2 and 4, the clamping frame, $f$, being carefully insulated by the insulating material, $p$, from remaining portions of the condenser unit.

After the unit is firmly pressed together and clamped, the unit is then made moisture proof by immersion in a bath of wax or paraffin compound brought to a boiling point, the unit being allowed to remain in the wax bath until all crevices are properly filled. In some cases it may be found desirable, and possibly necessary, to subject the unit to a vacuum treatment, in connection with its immersion in the wax bath, in order that all crevices may be filled by the hot wax. This process will cause the condenser to maintain its capacity constant in value regardless of atmospheric changes.

An equivalent method of construction may be used consisting of using a thin sheet of copper, silver or tin foil as a substitute for the metal coating and compressing the same under heavy pressure (or by hammering) against the dielectric.

In Figs. 5 and 6 a preferred detailed construction is shown; Fig. 5 showing a plan view of one side, and Fig. 6 showing a plan view of the other side of a condenser unit, compressed within the frame, $f$. In Fig. 5 a large part of the insulating material or plate is exposed; that is, it is not covered by the frame, $f$. The other side of the condenser unit is cut away in some manner similar to that shown in Fig. 6 whereby a portion of the ends of the insulating material or plate is exposed. An eyelet shaped metal binder is passed through the insulating material and the connecting plates which affords a convenient metallic means for connecting up the condenser in the circuits.

The condenser unit may be built up with as many electrodes or plates (using an odd number) with their corresponding dielectric sheets as shall be desired for the capacity required, and several condenser units may be combined anad connected in series or in parallel, or in series-parallel depending upon the capacity desired or the voltage to which it is subjected.

I claim:

1. An electrical condenser comprising in combination a stack, a plurality of alternately positioned conductive and dielectric plates in said stack, each of said dielectric plates having a baked coating of a metallic oxide thereon, said coating directly contacting with the surfaces of said conductive plates and means for securing said plates in said stack under pressure for forcing the metallic coating on said dielectric plates into intimate contact with the surfaces of said conductive plates and reducing the electrical resistance and dielectric hysteresis loss in said condenser.

2. An electrical condenser comprising a stack consisting of alternately positioned conductive and dielectric plates, each of said dielectric plates having a metallic coating welded to opposite surfaces thereof for directly contacting with the surfaces of said conductive plates, and means for forcing said dielectric plates into intimate contact with the conductive plates for decreasing the dielectric hysteresis loss and reducing the electrical resistance of said condsener.

3. An electrical condenser comprising a stack of alternately positioned conductive and dielectric plates, each of said dielectric plates having a coating of metal chemically combined on the surface thereof, and adapted to directly contact with the surfaces of said conductive plates, and means for securing said stack under pressure for forcing the coatings on said dielectric plates into intimate contact with the surfaces of said conductive plates for reducing the dielectric hysteresis loss and the electrical resistance of said condenser.

SAMUEL COHEN.